June 8, 1948. W. E. GILSON 2,442,805
METAL LOCATOR
Filed Feb. 26, 1945 3 Sheets-Sheet 2
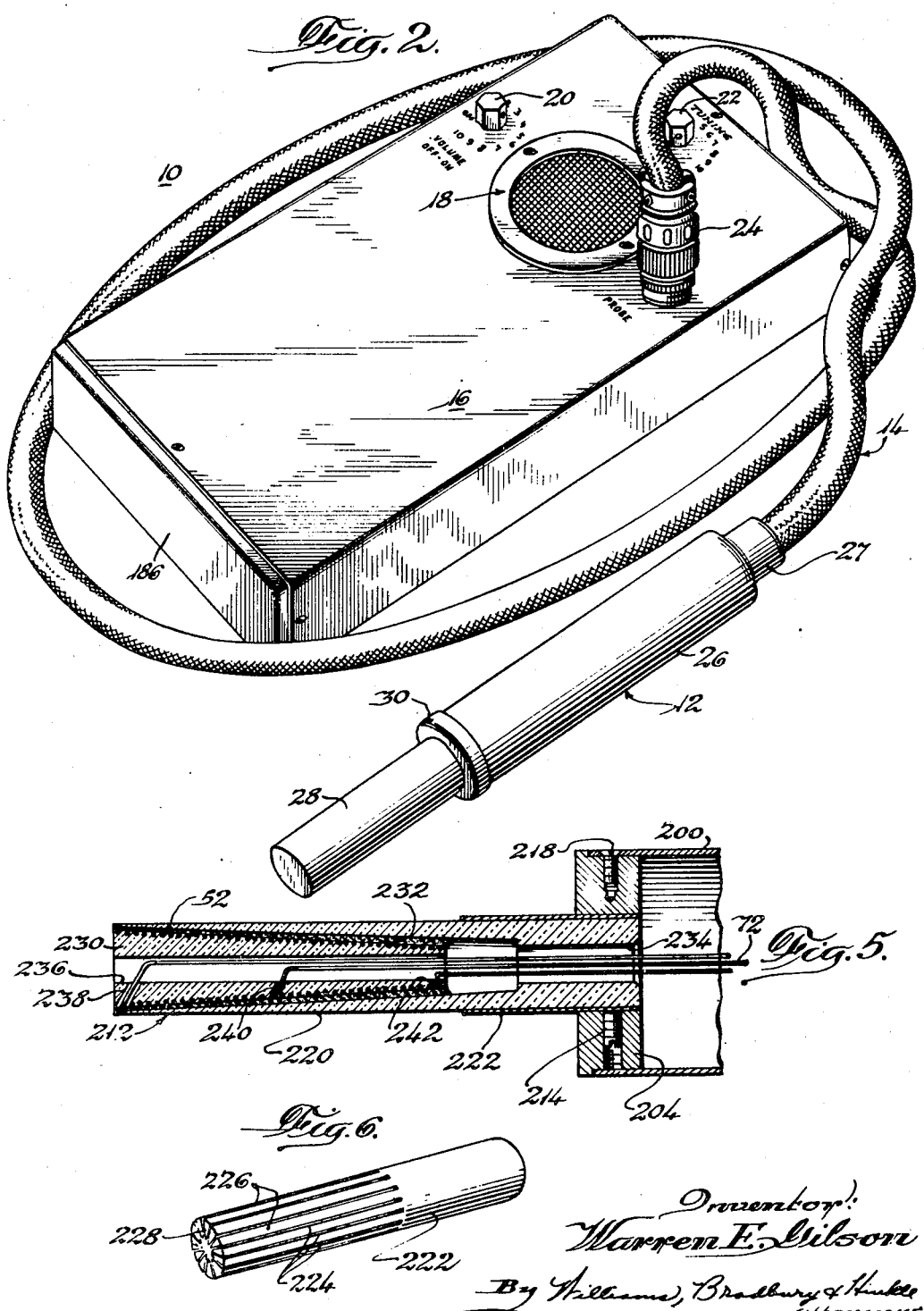

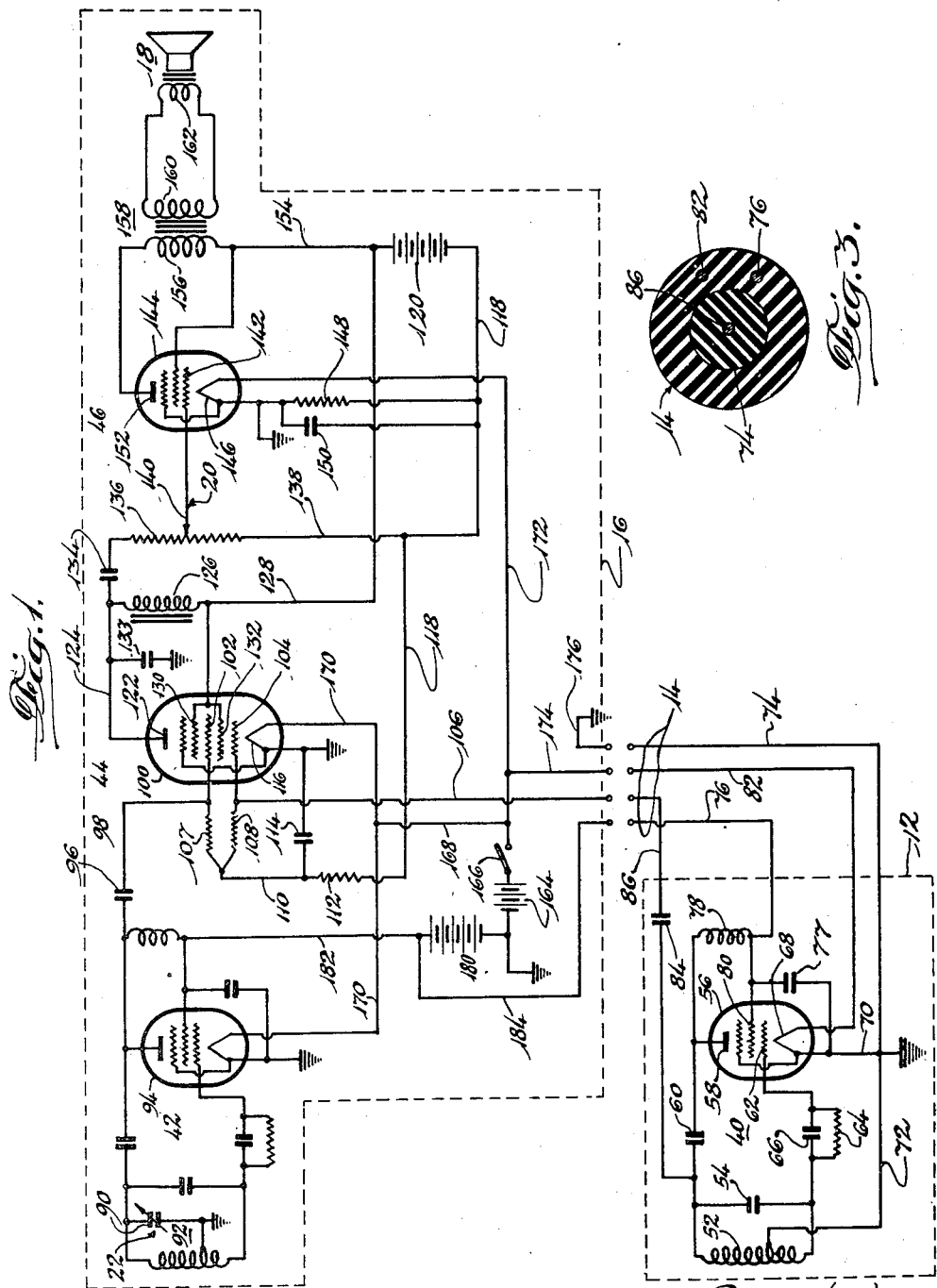

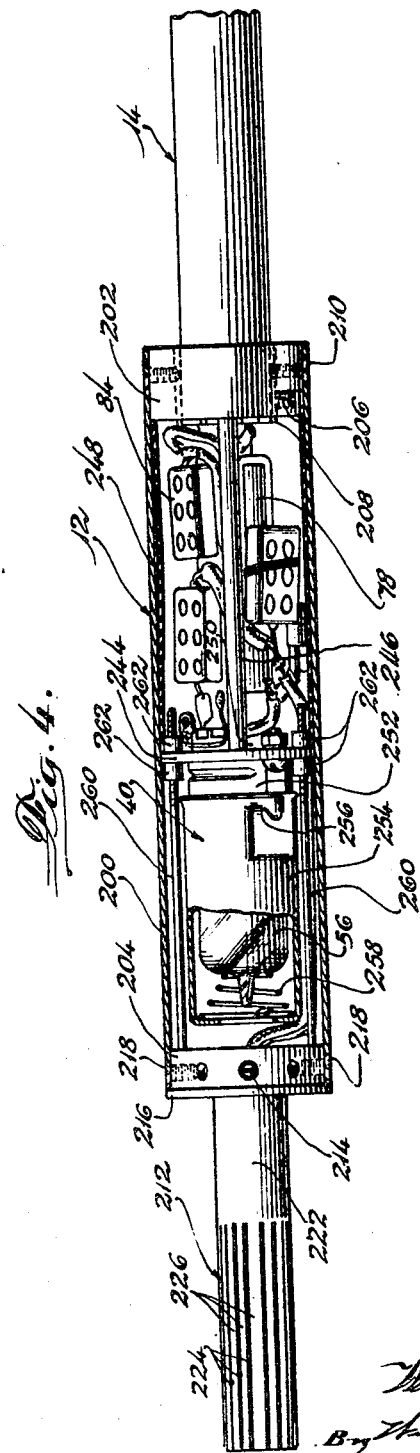

Patented June 8, 1948

2,442,805

UNITED STATES PATENT OFFICE 2,442,805

METAL LOCATOR

Warren E. Gilson, Madison, Wis., assignor to The Burdick Corporation, Milton, Wis., a corporation of Delaware Application February 26, 1945, Serial No. 579,769

12 Claims. (Cl. 128—2.1)

The present invention relates to metal locators and has for its primary objects the provision of new and improved metal locators and a surgical probe for use in the detection and location of metallic objects in the human body.

Another object of the present invention is to provide a new and improved electronic metal locator.

Another object of the present invention is to provide a new and improved metal locator which is portable, is not affected to any appreciable extent by temperature changes, does not require adjustment during use, and is not affected objectionably by extraneous objects or disturbances.

Another object of the present invention is to provide a new and improved metal locator having variable pitch audible indicating means for producing an indication of the presence of a metallic object.

A further object of the present invention is to provide a new and improved electronic locator of the beat frequency type including two oscillators, one of which, in accordance with one of the main features of the present invention, is located in a probe.

Another object of the present invention is to provide an apparatus of the character set forth in the preceding paragraph wherein the probe oscillator is capable of producing a large power output and is coupled to a mixer device through a loose coupling, such as a small condenser, whereby changes in the position and shape of a cable connecting the probe to the mixer device does not affect the indication of the apparatus.

Another object of the present invention is to provide a new and improved surgical probe having a sensitive probing or exploring coil.

Another object of the present invention is to provide a new and improved metal locating apparatus including a sensitive exploring coil and associated shielding means which contributes to the sensitivity of the coil and small size of the probe.

Other objects and advantages of the present invention will become apparent from the ensuing description of embodiments thereof, in the course of which reference is had to the accompanying drawings, in which:

Fig. 1 is a diagrammatic representation of the electrical circuits and elements embodied in one embodiment of the invention;

Fig. 2 is a perspective view of a metal locator constructed in accordance with the present invention and including the circuits and elements shown in Fig. 1;

Fig. 3 is a cross sectional view of the flexible cable connecting the probe to the control box;

Fig. 4 is a plan view, partly broken away, of the probe with its outer sterilizable cover removed;

Fig. 5 is a fragmentary cross sectional view through the outer end of the probe, with certain features omitted better to illustrate the construction and location of the exploring coil; and Fig. 6 is a perspective view, upon a reduced scale, of the shield comprising part of the probe.

The locator of the present invention illustrated in Figs. 1 to 6, inclusive, is sensitive to metals by reason of the electrical conducting properties of the latter and, more particularly, by reason of the effect of the metals upon the inductance of an exploring coil. It includes a probe within which is housed an oscillator having its frequency determining coil at the tip of the probe and constituting the exploring coil. The oscillator is preferably constructed and arranged to operate at a high frequency of about 5.5 megacycles. When a piece of conducting metal is brought into the radio frequency field generated by the oscillator, the frequency of the generated oscillations is changed because of a change in inductance of the exploring coil and, the nearer the metallic object and coil, the greater the frequency change.

The locator also includes a second oscillator generating a frequency which may be considered normally to be fixed but which is variable to provide a tuning control. This second oscillator is generally adjusted to generate a frequency slightly below that of the probe oscillator and the two frequencies are mixed, or heterodyned, to produce an audible low pitch beat note in the speaker. This mixing or heterodyning is accomplished by suitable means, such as a mixer tube, the output of which is amplified and supplied to a loud speaker. Then, as a metallic object is approached by the probe, the approach is indicated by a rise in pitch.

In the detection of non-magnetic metallic objects, the high frequency field emanating from the exploring coil produces eddy currents in the metal. These eddy currents decrease the inductance of the exploring coil, thereby to increase the probe oscillator frequency and the audible beat note frequency.

In the case of ferrous magnetic materials, such as iron and steel, there are two effects, one tending to decrease and the other to increase the frequency of the probe oscillator. In all but small pieces of magnetic materials, the eddy current losses, decreasing the inductance of the exploring coil and increasing the probe oscillator frequency, predominate over the effect of increased permeability, which tends to increase the inductance of the exploring coil and to decrease the probe oscillator frequency. In the event these two effects balance, the object cannot well be located, and with one embodiment of the apparatus constructed in accordance with the present invention, pieces of magnetic material of about 1 mm. in diameter and 1 cm. long cannot well be detected because of this balancing effect.

In the detection of larger pieces of magnetic material, the eddy current losses predominate, thereby to decrease the inductance and increase the probe oscillator frequency, so that the approach of the probe to the metal is indicated by an increase in the frequency of the beat note. If the piece of iron is small, the permeability effects predominate to increase the inductance, thereby to decrease the probe oscillator and beat note frequencies.

Referring now to the drawings and first particularly to Fig. 2, the apparatus of the present invention is indicated as a whole by reference character 10. It includes a surgical probe 12 containing a high frequency oscillator connected through a flexible cable 14 to a control box 16 containing the control box oscillator, a loud speaker 18, a combined volume control and power switch 20, a tuning or pitch control 22 and batteries (not shown in the figure). The cable is detachably connected to the control box by a coupling 24.

In order that the probe and cable may be easily sterilized, the cable is of the rubber covered type and the probe is covered with a pair of rubber sleeves 26 and 28. The portion 26 covers the cable end of the probe, which is of somewhat larger diameter for reasons which will be made apparent shortly. The reduced diameter end 27 of sleeve 26 is cemented or otherwise secured in liquid-tight manner to the cable 14. The sleeve 28 covers the reduced diameter exploring end of the probe. It is provided with an enlarged end portion 30 which is cemented in liquid-tight manner to the adjacent end of rubber sleeve 26. The probe and cable are thus sealed by material enabling the cable and probe readily to be sterilized as a unit.

In accordance with one of the primary features of the present invention, the probe 12 is constructed and arranged to include a variable frequency generating means, preferably an electronic oscillator, the frequency of which is varied in response to the proximity of the oscillator frequency determining coil, or the exploring coil, to a metallic object. Furthermore, the oscillator is made to have a substantial energy output and is coupled through a loose coupling provided by suitable means, such as a small condenser, to a mixer tube housed in the control box, all to the end that movement of the probe and the resulting various bends and shapes of the cable will not affect the indication of the apparatus.

The various electrical elements and connections will now be described with particular reference to Fig. 1. The probe 12 includes an electronic oscillator indicated generally by reference character 40 and the control box includes a similar oscillator indicated generally by reference character 42. The outputs of the two oscillators are supplied to a mixer 44, the output of which is in turn connected to an amplifier 46 supplying the previously referred to loud speaker 18.

The frequency generated by the probe oscillator 40 is variable in response to the proximity of the exploring coil 52 to a metallic object. The exploring coil forms part of a tank circuit including also a fixed condenser 54 (of a value of about 50 mmf.) which will be recognized as constituting a part of a Hartley oscillator including also a vacuum tube 56 (which may be of the 1L4 type). Other types of oscillators, such as the Colpitts or tuned-grid-tuned-plate oscillators could be used, the tank and grid tank inductance coils of which, respectively, would be used as the exploring coils and be located at the tip of the probe. One terminal of the tank circuit is connected to the anode 58 of the tube through a blocking condenser 60 (.0005 mf.) and the other to the grid leak resistor 64 and bias condenser 66 (of about 15,000 ohms and .0005 mf., respectively) providing class C operation of the oscillator. The filamentary cathode 68 is connected to ground by conductor 70 and to an intermediate tap in coil 52 by conductor 72. Conductors 70 and 72 are also connected to a shield 74 included in the cable 14 as will be described hereinafter. Anode voltage is supplied to the tube through a conductor 76 connected to the anode through a choke coil 78 (of about 2½ millihenries). The screen grid 80 of the tube 56 is connected to the voltage supply conductor 76 and to the cathode by a by-pass condenser 77 (of about .0005 mf.). The cathode is supplied with heating current through a conductor 82 also included in cable 14.

As heretofore indicated, the oscillator frequency varies in response to the proximity of the exploring coil 52 to a metallic body. The frequency increases when the coil is brought closer to a non-magnetic body or larger magnetic body because of the eddy current losses and decreases when brought closer to a smaller magnetic body because of the overbalancing effect of increased permeability, the increase and decrease in frequency occurring as a result of the decrease and increase in inductance of coil 52 as heretofore indicated.

The variable frequency output from the probe oscillator 40 is supplied to the mixer 44 through a loose coupling, such as a small coupling condenser 84 (of about 50 mmf.) and conductor 86. The loose coupling arrangement provides a relatively high impedance so that the coupling between the oscillators will be sufficiently low to prevent locking and also to prevent even relatively large cable capacity changes from materially affecting oscillator tank circuit and changing the frequency of the oscillator in response to cable position and shape. It should be noted that while the coupling has been indicated as being through the condenser 84, other types of couplings such as resistive or inductive could be used. The loose coupling in conjunction with the substantial power output of the oscillator and the relatively large size of condenser 54 thus stabilizes the apparatus.

The control box oscillator 42 is normally operated at a fixed frequency but the frequency may be changed by the tuning control 22 which includes a variable condenser 90 in the tank circuit 92 of the oscillator. The oscillator includes also a tube 94 similar to the tube 56 of oscillator 40. Otherwise, the oscillator corresponds to the oscillator 40 and therefore will not be described in greater detail.

The output of the control box oscillator 42 is supplied to mixer 44 through a coupling condenser 96 (of about 10 mmf.) and conductor 98 where the two oscillator frequencies are heterodyned. The mixer may be a tube 100 (preferably of the 1R5 type). The conductor 98 from oscillator 42 is connected to grid 102 of the tube and cable conductor 86 leading from the probe oscillator 40 is connected to grid 104 by conductor 106. The two grids are connected through resistors 107 and 108 of about ¼ megohm) to conductor 110 connected to an oscillation preventing filter including resistor 112 and condenser 114 (of about ¼ megohm and .01 mf., respectively). Condenser 114 is connected across conductor 110 and ground, to which the filamentary cathode 116 of the mixer tube is also connected. The other end of resistor 112 is connected to conductor 118 leading to the negative side of an ungrounded anode voltage supply battery 120, whereby grid bias for tube 100 is supplied by the grid bias resistor 148 of the amplifier.

The anode 122 of the mixer tube is supplied with anode voltage from the battery 120 through conductor 124, an audio frequency choke coil 126 and conductor 128. Conductor 128 is also connected to grids 130 and 132 of the mixer tube. A by-pass condenser 133 (of about .005 mf.) is connected across the anode and ground of the tube.

The output of the mixer tube is coupled to the amplifier 46 through a coupling condenser 134 (of about .01 mf.) and resistor 136 (of about 3 megohms), one terminal of which is connected to the negative side of battery 120 through conductor 138.

The volume control 20 includes an adjustable potentiometer connection 140 connected between resistor 136 and grid 142 of an amplifier tube 144 (preferably of the 1S4 type). The cathode 146 of the amplifier tube is grounded and also connected to the negative but ungrounded side of battery 120 through a grid bias resistor 148 (of about 1,000 ohms) shunted by condenser 150 (of about 10 mf.). The resistor 148 also supplies grid bias for the mixer tube. The anode 152 of the amplifier tube is supplied with anode potential from the battery 120 through conductor 154 and the primary winding 156 of an audio output transformer 158, the secondary winding 160 of which is connected to the coil 162 of the loud speaker 18.

The filaments of the various tubes are supplied with heating current from a battery 164, the negative side of which is grounded and the positive side of which is adapted to be connected to the various filaments through a power switch 166, which is preferably connected to the volume control 20 in conventional manner. One side of each cathode is grounded so that when the switch 166 is closed all the filaments are connected in parallel across battery 164. The cathodes of tubes 94 and 100 are connected across the battery through conductors 168 and 170. The cathode of tube 144 is connected to the positive side of the battery through conductor 172. The cathode of tube 56 of the probe oscillator is connected to the positive side of the battery through conductors 174 and 82. Note that conductor 176, which connects to the cable shield conductor 74, provides a common ground for the probe and control box units.

Anode voltage is supplied to oscillator tubes 56 and 94 from a battery 180. Conductor 182 leads from the positive side of the battery to the anode of tube 94 while conductor 184 leads to the previously referred to cable conductor 76 leading to the anode of tube 56.

The batteries 120, 164 and 180 may be of known construction obtainable as a unit. This battery unit is removably mounted in one end of the control box 16, from which it may be removed by removing an end cover plate 186—see Fig. 2.

The cable 14 is preferably a multiple conductor flexible cable, a cross section of which is shown in Fig. 3. It includes the previously referred to shield 74 which is concentrically arranged relative to the centrally located high frequency conductor 86. The cathode and anode voltage supply conductors 82 and 76 are located to the outside of the shield 74 but are surrounded by rubber insulation, which also surrounds the shield and central conductor 86. The cable may have a suitable length, such as about 5 or 6 feet.

The probe of the present invention is illustrated in greater detail in Figs. 4, 5 and 6 illustrating one size of probe and to which reference is now had. As already indicated, the probe houses the oscillator 40 and the coupling condenser 84. All parts of the probe oscillator with the exception of the exploring coil 52 are mounted within the larger diameter portion of the probe and within a tubular metallic shell 200 made of some suitable conductive material, preferably aluminum. The opposite ends of the tube 200 are closed by apertured disc-like closure plates 202 and 204. The cable 14 extends through the central aperture in plate 202 to which it is secured by a plurality of set screws 206 threaded into the plate and securing a clamping ring 208 surrounding the cable end. The plate may be secured to the tube in suitable manner, as by a plurality of screws 210.

The reduced diameter exploring coil securing portion, which is indicated as a whole by reference character 212, is similarly secured to the other closure plate 204 by a plurality of set screws 214. The plate is provided with a circular flange 216 and secured to the tube 200 by a plurality of screws 218.

The exploring coil securing portion 212 is of a novel construction providing a sensitive apparatus and minimizing the effect of extraneous disturbances thereon. Referring now more particularly to Figs. 5 and 6, it may be noted that the reduced portion is constituted in the main by a rod-like coil support 220 preferably made of polystyrene, although other plastic materials may be used. The supporting rod is surrounded by a conductive tubular shield 222, the coil surrounding portion of which is provided with a series of longitudinal slots 224 defining spaced apart finger-like extensions 226 thereby to reduce eddy current losses which would otherwise be induced by the high frequency currents in the exploring coil. The ends of extensions 226 of the shield are bent radially inward as indicated by reference character 228 to enhance the shielding and better to secure the shield in place. The shield, which is preferably made of brass of a thickness of about .0015", is suitably secured to the rod as by polystyrene cement.

In accordance with another of the features of the present invention contributing to a device of greater sensitivity and of greater efficiency, the exploring coil 52 is helically wound in generally conical shape with the larger diameter portion disposed substantially at the tip of the coil supporting rod 220. To facilitate manufacture, the coil is preferably wound about a hollow coil form 230 (see Fig. 5). The form may be provided with a threadlike groove better to receive the coil, after which the coil is cemented in place and the coil assembly is inserted and cemented within the conical outwardly flared opening 232 at the outer end of the coil supporting rod 220 by suitable means such as polystyrene cement. The three conductors leading to the exploring coil, of which only the tap conductor 72 has been numbered, are led to the coil through a passageway 234 extending centrally through the rod 220, the central hollow 236 in the coil form 230 and three spaced apart bores 238, 240 and 242 extending generally radially from the central hollow to the exterior of the coil form.

The outwardly flared conical coil produces a magnetic field that extends further radially from the tip of the probe thereby increasing the sensitivity of the apparatus.

The conical shape of the coil coupled with the tubular shape of the shield provides an effective and efficient shield. A considerable part of the coil is at a substantial distance from the shield thereby making the shield more effective and making it possible to make the probe with small diameter. The positional relationship of the coil and shield also cuts down the eddy current losses in the shield, as most of the flux passes out at the open tip of the coil.

The two housing closure plates 202 and 204, and a central supporting plate 244 are utilized to support the various elements of the probe oscillator. The central plate 244 is rigidly secured to plate 202 by a pair of diametrically opposite axially extending supports 246 rigidly secured to the plates as by brazing. The various condensers and conductors are readily mountable in the space between the plates as is the choke coil 78, which is preferably covered with insulating material, such as varnished cambric. The elements supported between the two plates are preferably insulated from the tube 200 by another layer or so of varnished cambric 248.

The oscillator tube 56 is mounted in the space between the forward closure plate 204 and the central plate 244. Its socket 250 is secured to the central plate end as is the stationary portion 252 of a tube shield. The shield also includes a detachable portion 254 secured to the stationary portion as by a bayonet type fitting indicated generally by reference character 256. To insure the retention of the removable shield portion 254 during use, the latter is biased outwardly by a spring 258 secured to the inside of it and bearing against the outer end of the tube.

To facilitate assembly, the closure plate 204 is movably secured to the central plate 244 by a pair of rods 260 and nuts 262 threaded onto the rods and engaging opposite sides of the central plate.

From the foregoing detailed description of the above described embodiment of the present invention, it may be noted that the apparatus includes many novel functional and structural features contributing toward economy in manufacture, and stable, reliable and efficient operation.

The apparatus is capable of locating both non-ferrous and ferrous metal objects. To use the apparatus, the cable and probe are sterilized up to within a few inches of the coupling 24 in a suitable solution such as bichloride solution. The cable is then coupled to its associated receptacle in the control box. The volume control 20 is operated to close the switch 166, and thereby to energize the apparatus, and then adjusted to turn the volume about half way. The tuning control 22 is then initially adjusted to change the frequency of the control box oscillator 42 until a whistle is heard. The tuning control is thereafter adjusted to "zero beat" a setting at which the whistle-like noise ceases after changing from high to low pitch and then back from low to high pitch, with the control moving in one direction. The tuning control is preferably adjusted slightly to the right of the zero beat position, giving a low pitched tone. Then, when the exploring coil at the tip of the probe approaches a metal object, the approach is indicated by a rise in the pitch of the sound emanating from the loud speaker. As heretofore indicated, this is because the inductance of the exploring coil 52 is decreased as the coil approaches a nonmagnetic or larger magnetic metallic object and is increased as the coil approaches a smaller nonmagnetic metallic object.

The apparatus is sensitive because of the conical construction of the exploring coil, which construction and the described shielding also contribute to the efficiency of the device. The shielding is effective because of the distance between it and the coil. Temperature changes have no substantial effect upon the apparatus and continuous or frequent adjustment of the device is not necessary in use.

While the present invention has been illustrated in accordance with specific details of one embodiment of the invention, it should be understood that these details are not to be construed as limitative of the invention except in so far as set forth in the accompanying claims.

Having thus described my invention, what I claim as new and desire to secure by Letters Patent of the United States is:

1. Metal locating apparatus, including in combination, a pair of high frequency oscillators and a mixer tube for providing a beat frequency audio output, a portable probe housing one of said oscillators, said one oscillator having a substantial energy output, the last said oscillator including an electronic tube and a tuned oscillator coil, said coil being disposed at the end of the said probe so as to change the frequency of said oscillator when metal objects are brought within the field of said coil, a flexible cable for connecting the output of the last said oscillator to the mixer tube, and means for preventing capacity disturbances in said cable from substantially affecting the frequency of the probe oscillator, the last said means including a loose coupling means in the probe between the oscillator circuit therein and said cable and the output of said probe oscillator being sufficient to give a substantial signal through said loose coupling means.

2. An apparatus as claimed in claim 1 wherein said one oscillator includes a frequency determining condenser which is relatively large compared with cable capacity variations occurring in use of the probe.

3. An apparatus as claimed in claim 1 wherein said loose coupling means is constituted by a relatively small condenser, said one oscillator including a frequency determining condenser of about the same size as said last mentioned condenser, and both condensers are relatively large compared with cable capacity variations occurring in the use of the probe.

4. A surgical probe, including in combination, a portable probe defining housing, and a high frequency oscillator mounted within said probe, said oscillator including a frequency controlling coil responsive to the presence of metals mounted at the tip of the probe, said coil being of generally conical configuration and located with its larger diameter end at the tip of the probe.

5. A surgical probe, including in combination, a rod-like coil support having a generally conical outwardly flared opening at its tip, a generally conical outwardly flared conical coil mounted in said opening, and a generally conical coil support for the coil, said coil and coil support constituting a separate assembly insertable into said opening.

6. A surgical probe, including in combination, a generally conical outwardly flared exploring coil at the tip of the probe, and a tubular non-magnetic metallic shield surrounding and spaced from the coil.

7. An apparatus as claimed in claim 6, wherein said shield is slotted lengthwise in the region of the coil to provide a plurality of spaced apart finger-like extensions surrounding the coil.

8. A surgical probe, including in combination, a smaller diameter exploring coil supporting portion, a larger diameter handle portion, said last named portion including a generally tubular casing, a closure plate for one end, a closure plate for the other end supporting said smaller diameter portion, an intermediate plate secured between said closure plates, and an electronic tube supported axially of said tubular member by said intermediate plate.

9. A surgical probe, including in combination, a smaller diameter exploring coil supporting portion, a larger diameter handle portion, said last named portion including a generally tubular casing, a closure plate for one end, a closure plate for the other end supporting said smaller diameter portion, an intermediate plate, means fixedly securing said intermediate plate to said one plate, means detachably and movably securing said intermediate plate to said one plate, and an electronic tube detachably supported axially of said tubular member in the space between the intermediate and other end closure plates by said intermediate plate.

10. Metal locating apparatus, including in combination, a housing, a first oscillator having manually adjustable frequency adjusting means mounted in said housing, a portable probe having an oscillator including a frequency varying exploring coil mounted thereon, and means including a flexible cable and a mixer tube for combining the outputs of said oscillators to provide a beat frequency output.

11. A surgical probe including, in combination, a handle forming member having a portion of smaller diameter extending from one end thereof, means forming an oscillator circuit disposed within said probe including an electronic tube and a tuned oscillator coil, said coil being located within the smaller diameter portion so as to change the frequency output of the oscillator circuit when metallic particles are brought within the field of said coil, and means forming an electrostatic shield substantially completely enclosing said coil.

12. A surgical metal locator comprised of a handle forming member having a portion of smaller diameter extending from one end thereof, means forming an oscillator circuit disposed within said probe including an electronic tube and a tuned oscillator coil, said coil being located within the smaller diameter portion so as to change the frequency output of the oscillator circuit when metallic particles are brought within the field of said coil, means forming an electrostatic shield substantially completely enclosing said coil, a cable connected for conducting the variable radio frequency output of said oscillator to a remote point, and means at said remote point for detecting changes in the frequency output of the probe oscillator.

WARREN E. GILSON.

REFERENCES CITED

The following references are of record in the file of this patent:

UNITED STATES PATENTS

| Number | Name | Date |
| --- | --- | --- |
| 1,266,287 | Longoria | May 14, 1918 |
| 2,018,080 | Martienssen | Oct. 22, 1935 |
| 2,241,190 | Fenning | May 6, 1941 |
| 2,271,951 | Pearson et al. | Feb. 3, 1942 |
| 2,298,125 | Hartman | Oct. 6, 1942 |
| 2,321,355 | Berman | June 8, 1943 |
| 2,321,356 | Berman | June 8, 1943 |
| 2,352,011 | Rose et al. | June 20, 1944 |
| 2,393,717 | Speaker | Jan. 29, 1946 |

OTHER REFERENCES

Information Circular #6854, U. S. Dept. of Interior, Oct. 1935, "Induction prospecting for small metallic objects," Figs. 17, 18, pp. 13 to 16.

Certificate of Correction

Patent No. 2,442,805.

June 8, 1948.

WARREN E. GILSON

It is hereby certified that errors appear in the printed specification of the above numbered patent requiring correction as follows: Column 9, strike out lines 41 to 49 inclusive, comprising claim 10; for the claims now appearing as "11" and "12" read *10* and *11* respectively; in the heading to the printed specification, line 7, for "12 Claims" read *11 Claims*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.*